Feb. 28, 1961 A. WILSON 2,972,895
VIBRATING MEANS FOR SCREENS AND THE LIKE
Filed Aug. 7, 1958 2 Sheets-Sheet 1
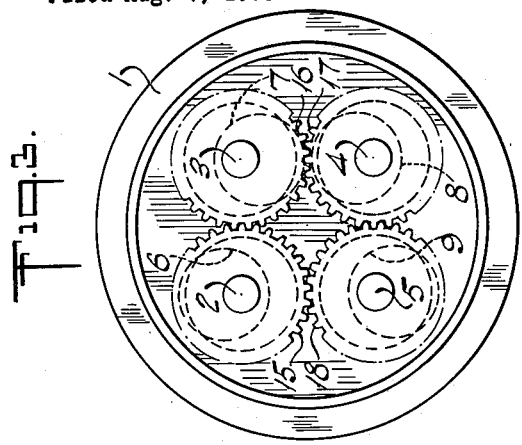
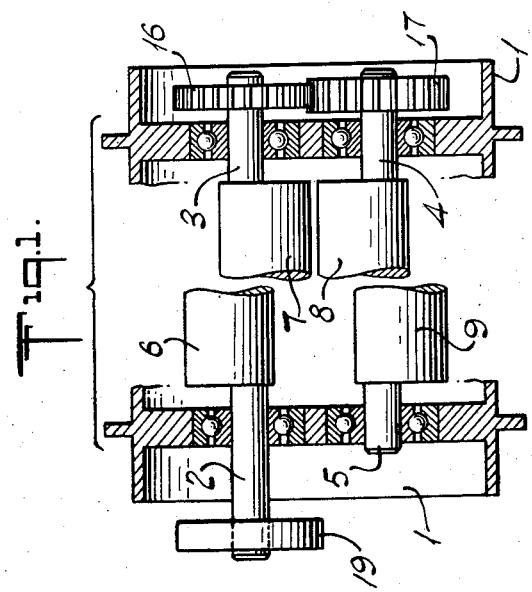
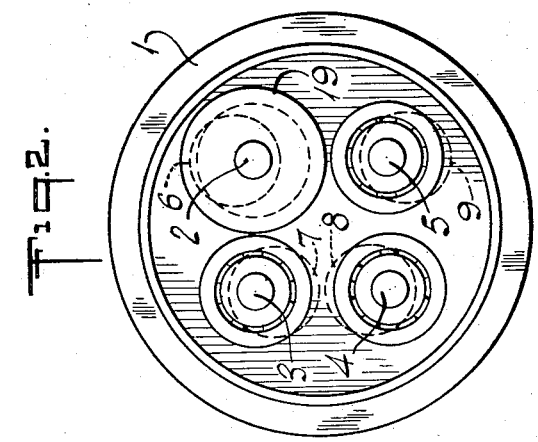
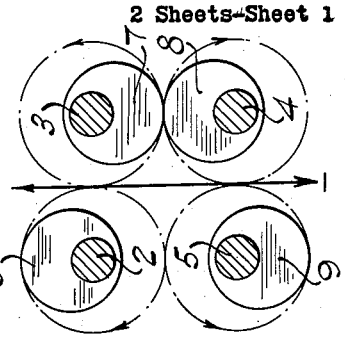
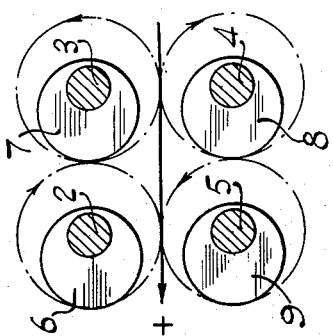
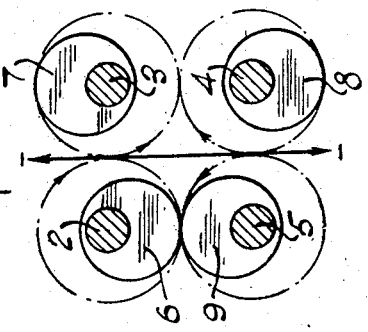
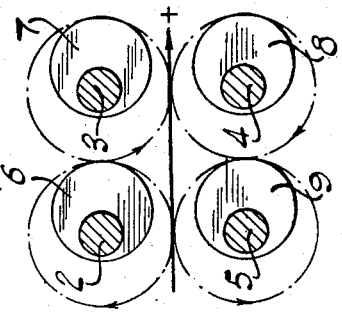
INVENTOR
ALBERT WILSON
BY
Burgess, Ryan & Hicks
ATTORNEYS

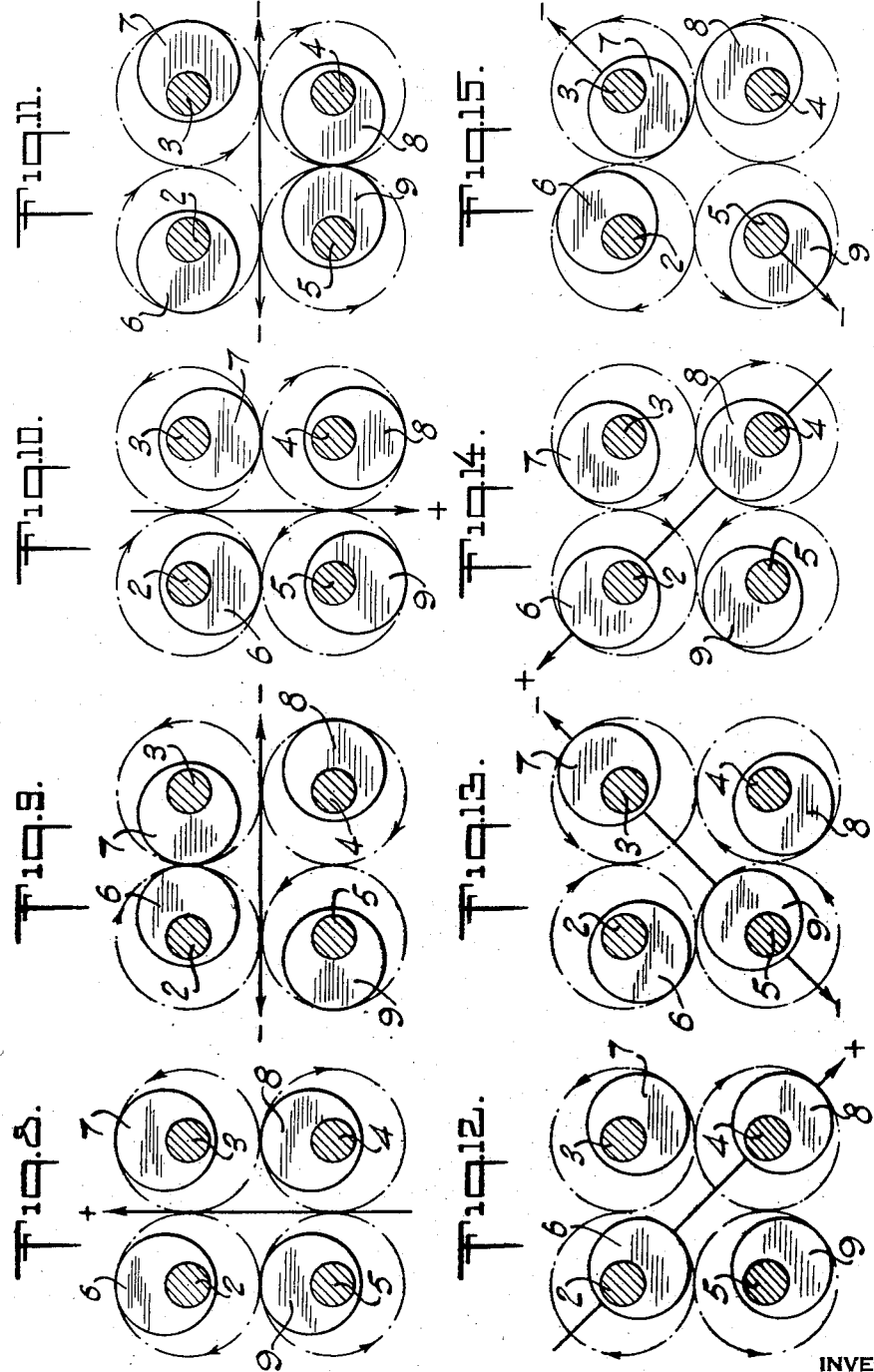

United States Patent Office 2,972,895
Patented Feb. 28, 1961

2,972,895

VIBRATING MEANS FOR SCREENS AND THE LIKE

Albert Wilson, Garfield, N.J., assignor to Hewitt-Robins Incorporated, New York, N.Y., a corporation of New York Filed Aug. 7, 1958, Ser. No. 754,123

3 Claims. (Cl. 74—61)

This invention has to do with vibratory apparatus such as is used for screening, shaking, conveying and like purposes and particularly to the means for effecting the vibratory action of any such apparatus.

In vibrating means as used for such purposes heretofore, the common practice has been to use two rotating eccentric weights, usually in the form of eccentric shafts, but the present invention makes use of at least four such eccentrically weighted shafts and so geared together and timed that the weights interact to create vibration alternately in opposite directions along any of a number of desired lines of action. As will presently be apparent, the arrangement makes feasible the use of smaller individual weights for any given capacity and hence reduces shaft and bearing loads and, in the result, greatly increases the life of the bearings. Furthermore, the invention makes it possible to handle larger loads without resort to oversize bearings, with their attendant lubrication problems.

The invention will be readily understood from the following description of the preferred arrangement illustrated in the accompanying drawings in which:

Fig. 1 is a schematic section of one form of vibrator means incorporating the invention;

Fig. 2 is a left hand elevation of the apparatus of Fig. 1;

Fig. 3 is a right hand elevation of the apparatus of Fig. 1;

Figs. 4-7 are diagrams of successive weight dispositions in an arrangement timed for producing a horizontal line of action;

Figs. 8-11 are corresponding diagrams in an arrangement for producing a vertical line of action; and Figs. 12-15 are corresponding diagrams in an arrangement for producing a diagonal line of action.

No particular form of apparatus to be vibrated is disclosed herein because it forms no part of the invention, the vibrating means of this invention being adapted to be secured to the body to be vibrated in any conventional or suitable manner.

The vibrating means may take the form of a unit adapted to be so secured by means of the spaced bearing housings 1 of Figs. 1-3 and journaled in these housings are four eccentrically weighted shafts of which the shaft bearing end portions are designated 2, 3, 4 and 5 and the eccentric weight portions 6, 7, 8, 9. As illustrated, the weight portions are cylindrical bodies with axes offset from the axes of the shafts. The centers of mass of these weights is on the central axis of the cylinder, while the axes of rotation of the weights coincide with the axes of the shafts. When using the minimum of four, these shafts, i.e. the bearing end portions, are symmetrically disposed about an imaginary fifth or central axis and are directly coupled together by equal gears 15, 16, 17, 18 (Fig. 3). Any one of the shafts may be driven, as by sheave 19 and it will be seen that while the shafts are all driven at the same speed, adjacent shafts are rotated in alternately opposite directions, that is (as viewed in any of Figs. 4-7) when the shaft 2 is rotated clockwise, the shaft 3 will rotate counterclockwise, the shaft 4 clockwise and the shaft 5 counterclockwise. The positions of the four shafts as shown in Fig. 3 may be termed a square array. It will be understood that slight variations in this array may be made without seriously affecting the operation of the machine. For example, gears 17 and 18 may be spread apart slightly so that they no longer mesh, an arrangement which makes the vibrator easier to assemble.

The gears are specially timed (meaning meshed in relation to the angular disposition of the eccentric weight portions of the shafts) in accordance with the direction of the desired line of action of the vibratory motion created by the weights. Several arrangements are illustrated diagrammatically in Figs. 4-12.

Referring to Fig. 4 as a starting position, the timing will be seen to be such that in such position the centers of mass of all of the eccentric weights are to the right; 90° later (Fig. 5) the weights 6, 9 of the adjacent shafts comprising the left hand pair are in what may be termed proximate opposition to one another (i.e. exerting neutralizing thrust forces) while the weights 7, 8 of the adjacent shafts comprising the right hand pair are in what may be termed remote opposition to one another (i.e. exerting neutralizing pulling forces); 90° later (Fig. 6) the eccentric weights are all at the limits of their throws to the left; and 90° later (Fig. 7) the positions of the weights are the reverse or a mirror image of those of Fig. 5.

The result as indicated by the straight line arrows and plus and minus signs is that a horizontal line of action is established. This is because in Fig. 4 the weights are all at the limits of their throws to the right, with the resultant of their centrifugal forces imparting motion in that direction to the body to which the vibrating means is secured; in Fig. 5 two of the weights are thrown upwardly and two downwardly, their centrifugal forces neutralizing one another; in Fig. 6, all of the weights are thrown to the left, imparting motion in that direction to the body to which the vibrating means is secured; and in Fig. 7, the weights again neutralize one another. Along the horizontal line of action an alternating force acts, while no force acts in a direction perpendicular to the line of action. The alternating force is the resultant of the centrifugal forces applied by each weight, these latter being equal to the product of the mass of the weight, the distance from its axis of rotation to its center of mass, and the square of the angular velocity.

Figs. 8-11 illustrate the timing appropriate to establish a vertical line of action, the difference being that the weight positions are all 90° off-set from those of the corresponding Figs. 4-7 and in directions appropriate to produce the same alternating throws and neutralizing actions.

Figs. 12-15 illustrate the similar results which can be achieved in the way of establishing a diagonal or 45° line of action. It will also be recognized from this that, by using an even number of shafts arranged symmetrically about an axis as described above, the line of action of the vibrator may be changed to any angle desired with no other adjustment in the vibrating mechanism than in the timing of the gearing. Such a change in the line of action will not result in a torque about the center of the assembly as would be the case where only one pair of weights is used or where the shafts are arranged in a straight line with respect to each other.

While the use of four equal weights has practical advantages, it will be recognized that in all of the illustrated timing arrangements substantially the same results are achieved provided the weights are equalized in pairs. In Figs. 4–7, for example, it is generally sufficient if the weights of the left hand pair are equal to one another and the weights of the right hand pair are equalized, even though the weights of one of such pairs differ from the weights of the other. It will be understood that the terms equal or equalized weights as used herein mean that the centrifugal forces due to the rotation of the weights about their axis of rotation are the same for any pair. In other words, the product of the mass of the weight and the distance from its axis of rotation to its center of mass should be the same for the weights of each pair.

As will be apparent, the principles exemplified by the illustrated form of the invention may be embodied in various arrangements to suit the exigencies of particular installations or as may be preferred; and, in the light of the foregoing, the following is claimed:

1. Vibrating means for screens and the like for producing an alternating force along a desired line of action comprising parallel shafts, each of said shafts having a longitudinal axis, each shaft further having an eccentric weight portion disposed eccentrically of its axis, said vibrating means having a central axis, said shafts being arranged with their axes parallel to said central axis of said vibrating means, said shafts further being arranged in two pairs diametrically disposed with respect to said central axis, means drivingly interconnecting said shafts for timed relative rotation of the shafts of each pair in the same direction and the shafts of each pair in a direction opposite that of the shafts of the other pair.

2. The vibrating means of claim 1 wherein each shaft rotates in a direction opposite the direction of rotation of the shafts immediately adjacent thereto.

3. The vibrating mechanism of claim 2 wherein said means drivingly interconnecting said shafts comprises gear means connected to each shaft, each shaft being directly connected by its gear means to at least one adjacent shaft by the gear means connected to the latter whereby each shaft rotates in a direction opposite to the shafts to which it is directly connected.

References Cited in the file of this patent

UNITED STATES PATENTS

| | | |
|---|---|---|
| 2,206,386 | Bernhard | July 2, 1940 |
| 2,227,867 | Steinhaus | Jan. 7, 1941 |
| 2,766,629 | Booth | Oct. 16, 1956 |

FOREIGN PATENTS

| | | |
|---|---|---|
| 221,128 | Great Britain | Aug. 25, 1924 |
| 625,743 | Germany | Feb. 14, 1936 |
| 888,521 | France | Sept. 6, 1943 |

Notice of Adverse Decision in Interference

In Interference No. 92,798 involving Patent No. 2,972,895, A. Wilson, Vibrating means for screens and the like, final decision adverse to the patentee was rendered Apr. 2, 1963, as to claims 1, 2 and 3.

[*Official Gazette August 27, 1963.*]